Oct. 18, 1932.                E. BURHORN                1,883,533
                           COOLING APPARATUS
                          Filed May 13, 1930
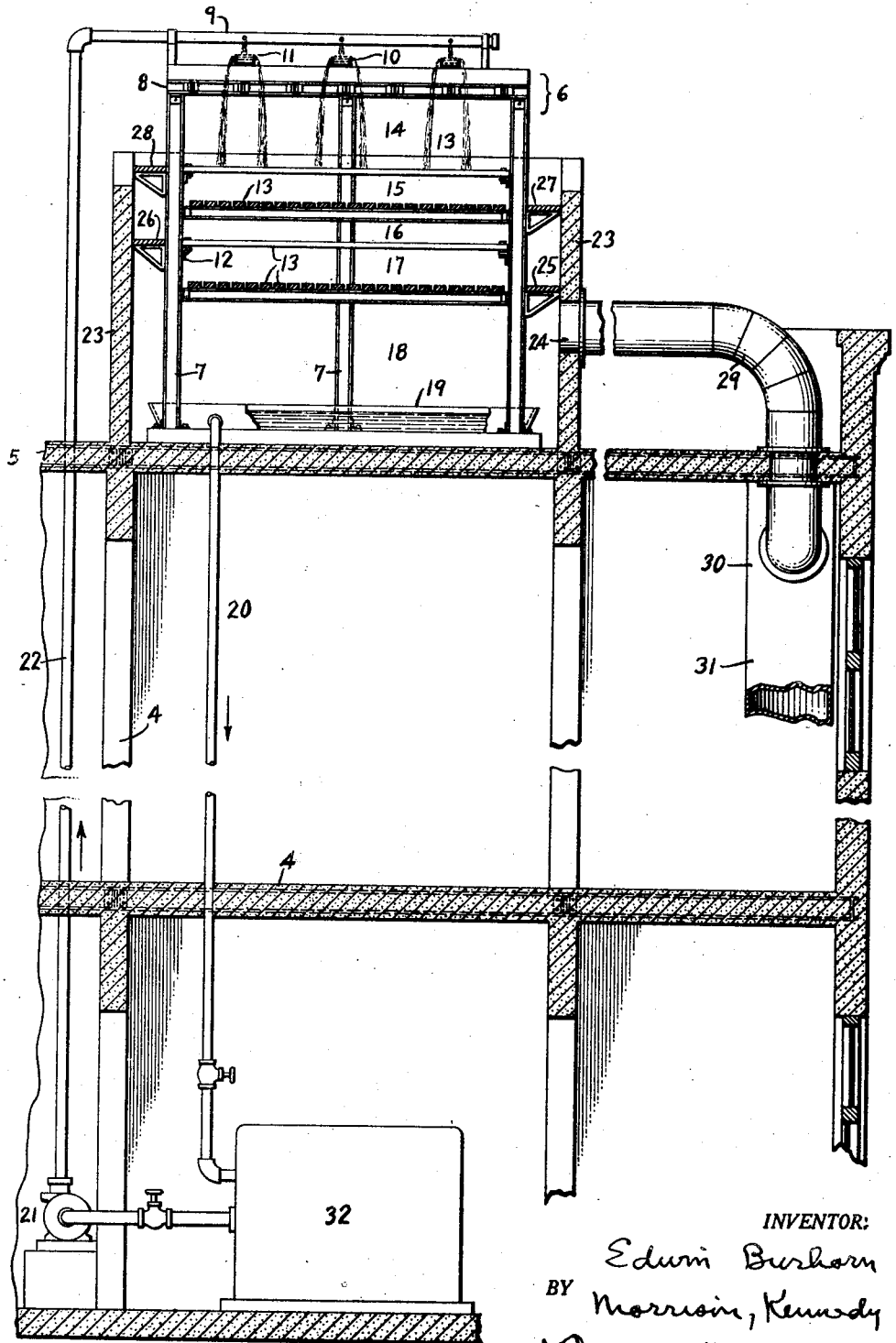
INVENTOR:
Edwin Burhorn
BY Morrison, Kennedy
& Campbell, ATTORNEYS.

Patented Oct. 18, 1932

1,883,533

UNITED STATES PATENT OFFICE

EDWIN BURHORN, OF HOBOKEN, NEW JERSEY

COOLING APPARATUS

Application filed May 13, 1930. Serial No. 451,940.

This invention is a novel cooling apparatus, and relates primarily to the cooling of water for condensing, refrigerating or analogous purposes. Instances of the use of the invention are, for office or dwelling buildings containing power or refrigerating plants and with ventilating systems, and wherein the exhausted or stale air is drawn from the building and discharged into outside atmosphere.

The general object of the present invention is to afford increased efficiency of cooling action and economy of operation. A particular purpose is to utilize the discharge or outgoing draft of a ventilating system to improve the action of a water cooling apparatus or tower. Other and further objects and advantages of the invention will appear in the hereinafter following description of an illustrative embodiment thereof or will be understood by those conversant with the subject.

To the attainment of such objects and advantages the present invention consists in the novel cooling apparatus and the novel features of method, operation, arrangement and construction herein illustrated or described.

In the accompanying drawing the single figure is a more or less diagrammatic illustration, partly in elevation and partly in vertical section, of a building provided with the features of this invention.

In one aspect the invention may be described as a combination comprising a cooling tower, located at the top of the building, walls laterally enclosing the tower for vertical or upward circulation of air through the tower, a water distributor at the top of the tower, the same fed by a pipe from the condensing or refrigerating system to be cooled by the water, with a vessel at the bottom of the tower for collecting the cooled water and the pipe therefrom to the system to be cooled by the water, along with an air duct of a ventilating system connected into circulation with the cooling tower within its enclosing walls, whereby the exhaust air from the ventilating system is compelled to traverse the tower and thereby afford a forced circulation and continuous cooling action, such as is not available with cooling towers operated solely by natural air movements.

In the illustrated embodiment of the invention a building is indicated by its frame members 4 and roof structure 5, above which is a cooling tower 6 that may be constructed of upright frame members 7 interconnected at the top by cross members 8. A water distributing pipe 9 is shown at the top of the tower bringing the hot water to a point whence it may be showered down through the tower for cooling actions. Preferably the distributed water is first caught by a preliminary or distributing deck composed of troughs 10 which may have notched edges 11 for overflow at designated points, the descent then passing by gravity to successive cooling decks, each composed for example of deck beams 12 constituting parts of the tower with overlying deck members, troughs or slats 13 arranged to receive the descending water, delay its descent, redistribute it, and pass it on to the next deck below, the slats in successive decks being preferably at relative right angles.

The between deck spaces may be designated as the space 14 between the trough deck 10 and the first slat deck, the space 15 between the last mentioned deck and the one beneath, and the spaces 16, 17 etc., as far as the system may be carried, to a final space 18 below the lowermost deck, through which the water descends to a suitable collecting vessel 19 at the foot of the tower.

A cooling tower of this general structure is shown for example in my prior Patents Nos. 1,610,225 of December 14, 1926, 1,555,827 of October 6, 1925, etc. Instead however of top distribution of water to a series of successive decks the tower might be of a type such as shown in my Patent No. 1,490,254 of April 15, 1924, where the water is sprayed by a succession of upwardly directed jets through the height of the tower. Or the tower might be of the type shown in my Patent No. 1,732,963 of October 22, 1929, wherein the condenser is located in the tower space 18 rather than at a removed position as herein disclosed.

In the drawing hereof the cooled water is shown taken from the collecting vessel 19 by a water pipe 20 leading to the condensing or refrigerating apparatus, as will be described, and thence to a water pump 21 which forces the water to ascend by a return pipe 22 to the tower or to the distributor 9 thereof.

This invention in its preferred form comprises a system of closed walls 23 surrounding the cooling tower so as to prevent natural air currents passing therethrough, and permit vertical circulation instead. I prefer a combined arrangement wherein the enclosing walls 23 are shorter than the height of the tower 6, so that a substantial part of the tower stands up above the enclosing walls to be acted on by natural air currents. By this invention the cooling tower is to be operated by the use of the exhaust of the ventilating system, either wholly, or in combination with natural draft at a portion of the tower.

The enclosing walls 23 are shown spaced away from the tower at two opposite sides thereof, but they need not be so spaced at the other two sides, where the walls may be built substantially in contact with the cooling decks. This arrangement permits a to and fro air circulation as will next be described.

One enclosing wall 23 is provided with an air inlet opening 24 delivering forced circulation into the tower, preferably at its lower part, although this might be reversed. Such air is compelled to enter the tower space 18 by reason of a baffle 25 extending from the tower to the enclosing walls above the inlet 24, such baffle being a substantial continuation of the lowermost cooling decks. After traversing the space 18 the air ascends at the opposite side and thence back through the space 17 of the tower, being so compelled by a baffle 26 at the left side between the enclosing wall and the next lowest cooling deck. A similar baffle 27 at a higher level at the right compels the air to pass leftward through the tower space 16. This air, ascending at the left, may either pass out leftward, between the top of the enclosing wall and a final baffle 28, or may travel horizontally through the tower space 15 to the right and thence out to the atmosphere, depending on the direction of natural air flow surrounding the tower.

It will be understood that a substantial volume of exhaust air is in continuous flow through the tower as described, or vertically through a tower of other form such as Patent No. 1,490,254. As disclosed, the character of the cooling decks permits also a substantial quantity of air to percolate upward through each deck, thus running counter to the water trickling downward through the same openings and accentuating the cooling action. Above the top of the wall 23, and from the distributor 9 down to this point, the descending water is subject to the cooling action of natural air drafts, thus giving a preliminary cooling before the water is subjected to the forced air circulation as described.

The exhaust ventilating air may be conducted to the enclosing wall opening 24 by means of an air conduit 29 carrying the outgoing air in any desired arrangement. For example, there may be a suction fan 30 drawing the exhausted air through a vertical duct or flue 31 which may have connections throughout the building for extracting stale air. The outgoing air is usually regulated in temperature and humidity so that it gives a highly efficient cooling action, due to its continuous supply and substantially rapid travel in volume through the tower.

It is possible with this invention to vary the extent or proportion of cooling in the tower done by natural air drafts, as compared with the forced draft of exhaust air. For example removable wall sections may be arranged to be added to or subtracted from the wall 23 to change its height in relation to the tower, which may be constructed taller than shown, and with as many decks as desired, or other distributing means, within this invention.

The complete embodiment of this invention may be disclosed by referring next to the condensing or refrigerating apparatus, which is illustrative of analogous apparatuses. A condenser 32 is shown which may be the condenser of a refrigerating plant. It is supplied by the water pipe 20 for cooling purposes and delivers the warmed water to the pump 21. As illustrative of a refrigerating system the condenser 32 may deliver condensed refrigerant, as ammonia, to a receiving vessel from which the ammonia may be expanded through a valve to expansion coils wherein heat is extracted by a surrounding medium, the refrigerant thence passing to a compressor which pumps it under pressure back to the condenser, in accordance with the ammonia compression system of refrigeration.

Not only is a considerable saving of water effected by the described system, but power is saved since the same power apparatus which causes the circulation of air through the building serves also to cause circulation through the tower for cooling the tower water.

It will thus be seen that a water cooling apparatus has been described embodying the principles and attaining the objects of the present invention; but as certain matters of method, operation, arrangement or construction may be variously modified, it is not intended to limit the invention to such matters except to the extent set forth in the appended claims.

What is claimed is:

1. In combination, a water cooling tower, having superposed cooling decks, a water distributor at the top of the tower, walls laterally enclosing the lower part of the tower, the upper part of the tower being extended above the enclosing walls for cooling by natural air currents of the decending water, a vessel at the bottom of the tower receiving the cooled water, an air pipe conducting exhaust air into the bottom of the tower within its enclosing walls, and means compelling the exhaust air to traverse the between-deck spaces, back and forth, trending upwardly, with final discharge to atmosphere.

2. In combination, a water cooling tower, having superposed cooling decks, water supply means at the top, walls laterally enclosing the lower part of the tower, the tower being extended above the walls for cooling the water by natural air currents, a vessel at the bottom of the tower receiving the cooled water, means supplying air for circulation through the lower part of the tower within its enclosing walls, and means compelling the supplied air to traverse the between-deck spaces, back and forth, with final discharge to atmosphere.

3. In combination, a water cooling tower having spaced apart cooling decks, walls laterally enclosing the tower, for vertical circulation of air, a water pipe from a system to be cooled, a water distributor at the top of the tower, fed by said pipe, a vessel at the bottom of the tower for collecting the cooled water, a pipe from said vessel to the system to be cooled, an air duct operating under forced circulation and forcing air continuously into the cooling tower to pass through the same within its enclosing walls and thence to waste, and means within and constituting part of the tower for compelling the air to traverse the tower in back and forth manner between the successive cooling decks.

4. In combination, a cooling tower, having superposed cooling decks, walls laterally enclosing a portion only of the height of the tower, a water distributor at the top of the tower, a vessel at the bottom of the tower receiving the cooled water, an air discharge duct of a ventilating system conducting exhaust air under forced circulation into the enclosed end of the tower within its enclosing walls, with means compelling the exhaust air to traverse the between-deck spaces, back and forth, within such walls, with final discharge to atmosphere at the unenclosed portion of the tower.

In testimony whereof, this specification has been duly signed by:

EDWIN BURHORN.